United States Patent
Chen et al.

(10) Patent No.: US 10,120,092 B2
(45) Date of Patent: Nov. 6, 2018

(54) SYSTEM AND METHOD FOR ANALYSIS OF DEPOSITIONAL SETTINGS OF SUBSURFACE RESERVOIRS

(71) Applicant: CHEVRON U.S.A. INC., San Ramon, CA (US)

(72) Inventors: Mingya Chen, Bellaire, TX (US); Damian O'Grady, Houston, TX (US); Miguel O. Ascanio Regalado, Houston, TX (US); Dileep K. Tiwary, Houston, TX (US); Reynaldo Cardona, Houston, TX (US); Aygul Kostinovsky, Houston, TX (US)

(73) Assignee: CHEVRON U.S.A. INC., San Ramon, CA (US)

( * ) Notice: Subject to any disclaimer, the term of this patent is extended or adjusted under 35 U.S.C. 154(b) by 110 days.

(21) Appl. No.: 15/242,688

(22) Filed: Aug. 22, 2016

(65) Prior Publication Data

US 2018/0052249 A1    Feb. 22, 2018

(51) Int. Cl.
*G01V 1/28* (2006.01)
*G01V 1/40* (2006.01)

(52) U.S. Cl.
CPC ............... *G01V 1/40* (2013.01); *G01V 1/282* (2013.01)

(58) Field of Classification Search
CPC ........... G01V 1/282; G01V 1/307; G01V 1/40
See application file for complete search history.

(56) References Cited

U.S. PATENT DOCUMENTS

| | | |
|---|---|---|
| 5,343,440 A | 8/1994 | Kan et al. |
| 5,937,362 A | 8/1999 | Lindsay et al. |
| 6,411,902 B1 | 6/2002 | Wiltshire |
| 6,977,866 B2 | 12/2005 | Huffman et al. |
| 7,415,401 B2 | 8/2008 | Calvert et al. |
| 7,672,824 B2 | 3/2010 | Dutta et al. |
| 2010/0121623 A1 | 5/2010 | Yogeswaren |
| 2011/0208431 A1 | 8/2011 | Skelt |

(Continued)

OTHER PUBLICATIONS

Avseth, P. et al., Rock Physics and Seismic Properties of Sands and Shales as a Function of Burial Depth, Sep. 9-14, 2001, SEG Int'l Exposition and Annual Meeting, San Antonio, Texas.

(Continued)

*Primary Examiner* — Bryan Bui
(74) *Attorney, Agent, or Firm* — Marie L. Clapp

(57) ABSTRACT

A method is described for generating an improved digital image for a subsurface volume of interest that allows analysis of the depositional settings of rock facies in a subsurface volume of interest. The method may include identifying at least three different rock facies in the well log data; estimating a compaction trend for each of the at least three rock facies identified in the well log data to create at least three compaction trends; transforming the velocity model to produce a trend-match volume using the at least three compaction trends; and superimposing the trend-match volume and the seismic image to generate a digital image containing information regarding both structural features and stratigraphic features of the subsurface volume of interest. The method may be executed by a computer system.

6 Claims, 4 Drawing Sheets
(1 of 4 Drawing Sheet(s) Filed in Color)

(56) References Cited

U.S. PATENT DOCUMENTS

2011/0295510 A1* 12/2011 Gulati .................. G01V 1/28
                                                       702/16
2012/0059633 A1   3/2012 Dutta et al.
2013/0138410 A1   5/2013 Yogeswaren
2017/0335675 A1* 11/2017 Lee ..................... E21B 47/06

OTHER PUBLICATIONS

Birdus, S. et al., Making anisotropy in seismic imaging models conformal with geology and velocity: application to standard tomographic and higher resolution FWI velocity modeling, 2015 SEG New Orleans Annual Meeting.

Pedersen-Tatalovic, R. et al., Event-based low-frequency impedance modeling using well logs and seismic attributes, May 2008, The Leading Edge.

* cited by examiner

SYSTEM AND METHOD FOR ANALYSIS OF DEPOSITIONAL SETTINGS OF SUBSURFACE RESERVOIRS

TECHNICAL FIELD

The disclosed embodiments relate generally to techniques for determining depositional settings of reservoirs in the subsurface from geophysical seismic data and, in particular, to a method of generating a trend-match volume designed to differentiate between depositional settings in order to allow exploration, development, and production of hydrocarbon reservoirs.

BACKGROUND

Exploring for potential hydrocarbon reservoirs, determining the economic feasibility of producing the hydrocarbons, and developing the production plan, including where to drill wells, often uses seismic data to identify the structural features of the subsurface and well log data to identify the stratigraphy of the subsurface. The stratigraphy allows determination of the depositional setting, which is used for reservoir delineation and economic evaluation including risk analysis. The stratigraphy can be determined at the well locations but can only be estimated away from the wells.

Seismic exploration involves surveying subterranean geological media for hydrocarbon deposits. A survey typically involves deploying seismic sources and seismic sensors at predetermined locations. The sources generate seismic waves, which propagate into the geological medium creating pressure changes and vibrations. Variations in physical properties of the geological medium give rise to changes in certain properties of the seismic waves, such as their direction of propagation and other properties.

Portions of the seismic waves reach the seismic sensors. Some seismic sensors are sensitive to pressure changes (e.g., hydrophones), others to particle motion (e.g., geophones), and industrial surveys may deploy one type of sensor or both. In response to the detected seismic waves, the sensors generate corresponding electrical signals, known as traces, and record them in storage media as seismic data. Seismic data will include a plurality of "shots" (individual instances of the seismic source being activated), each of which are associated with a plurality of traces recorded at the plurality of sensors.

Seismic data is processed to create seismic images that can be interpreted to identify subsurface geologic features including hydrocarbon deposits. The seismic data may also be used to generate a velocity model of the subsurface using semblance analysis, tomography, and/or full waveform inversion. The velocity model based on the seismic data may be used in a seismic imaging method such as Gaussian beam migration, reverse time migration (RTM), or other imaging methods, to generate a 2-D or 3-D seismic image volume suitable for interpretation. The seismic velocity is influenced by many factors including compaction, pore pressure, lithology and so on, therefore seismic velocity itself is in general deemed unsuitable for interpretation. The velocity model without any modification is not appropriate for direct use in stratigraphic interpretation of the subsurface or for risk element evaluation because it is difficult to differentiate between different facies, particularly different shale facies.

Conventional regional stratigraphic interpretation methods mainly involve seismic facies analysis by mapping seismic stacks and calibrating it with wells. This can provide estimates of stratigraphic interpretations between wells; however, in areas where seismic data and/or wells are limited or seismic data quality is poor, seismic facies analysis can be very subjective.

There exists a need for methods to further process a velocity model to be used in combination with a seismic image volume to improve interpretation of subsurface structural and stratigraphic features for better evaluation of potential hydrocarbon reservoirs in the subsurface.

SUMMARY

In accordance with some embodiments, a method of generating an improved digital image for a subsurface volume of interest may comprise receiving, at a computer processor, a seismic image representative of the subsurface volume of interest and a velocity model; receiving, at the computer processor, well log data representative of wells drilled in an analogous region to that of the subsurface volume of interest; identifying, via the computer processor, at least three different rock facies in the well log data; estimating, via the computer processor, a compaction trend for each of the at least three rock facies identified in the well log data to create at least three compaction trends; transforming the velocity model using the at least three compaction trends to produce a trend-match volume via the computer processor; and superimposing, via the computer processor, the trend-match volume and the seismic image to generate a digital image containing information regarding both structural features and stratigraphic features of the subsurface volume of interest.

In another aspect of the present invention, to address the aforementioned problems, some embodiments provide a non-transitory computer readable storage medium storing one or more programs. The one or more programs comprise instructions, which when executed by a computer system with one or more processors and memory, cause the computer system to perform any of the methods provided herein.

In yet another aspect of the present invention, to address the aforementioned problems, some embodiments provide a computer system. The computer system includes one or more processors, memory, and one or more programs. The one or more programs are stored in memory and configured to be executed by the one or more processors. The one or more programs include an operating system and instructions that when executed by the one or more processors cause the computer system to perform any of the methods provided herein.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numerals refer to corresponding parts throughout the drawings.

DETAILED DESCRIPTION OF EMBODIMENTS

Described below are methods, systems, and computer readable storage media that provide a manner of seismic interpretation. These embodiments are designed to be of particular use for seismic interpretation of subsurface volumes using a processed velocity model to represent depositional settings.

Reference will now be made in detail to various embodiments, examples of which are illustrated in the accompanying drawings. In the following detailed description, numerous specific details are set forth in order to provide a thorough understanding of the present disclosure and the embodiments described herein. However, embodiments described herein may be practiced without these specific details. In other instances, well-known methods, procedures, components, and mechanical apparatus have not been described in detail so as not to unnecessarily obscure aspects of the embodiments.

The present invention includes embodiments of a method and system for generating and interpreting a digital image based on a seismic image and a modified velocity model representative of shale facies from different depositional environments. The method invented integrates different shale velocity compaction trends identified from a regional well database to decompose seismic velocity data into different shale facies. It transforms the seismic velocity model into a new volume, herein named the trend-match volume. The new trend-match volume has the compaction trends stripped out, which typically dominated the seismic velocity data, and has values that are directly linked to different shale facies, which is associated with different depositional settings. The interpretation of the depositional setting can help evaluate key risk elements for exploration, leading to improved decisions in lease purchases and production planning, including decisions on where to drill wells. It provides an additional tool for seismic facies analysis and can be used for establishing a 3D stratigraphic model even with 2D seismic data. When dealing with 2D seismic data, a 2D seismic velocity profile can be interpolated to generate a 3D seismic velocity volume. It usually requires calibration of the 2D velocity volumes from survey to survey if multiple surveys are involved. The interpolation can be done along geologic horizons if such horizons are available. This generated 3D seismic velocity volume can then be used to generate 3D trend-match volume for 3D stratigraphic interpretation.

Figure 1:
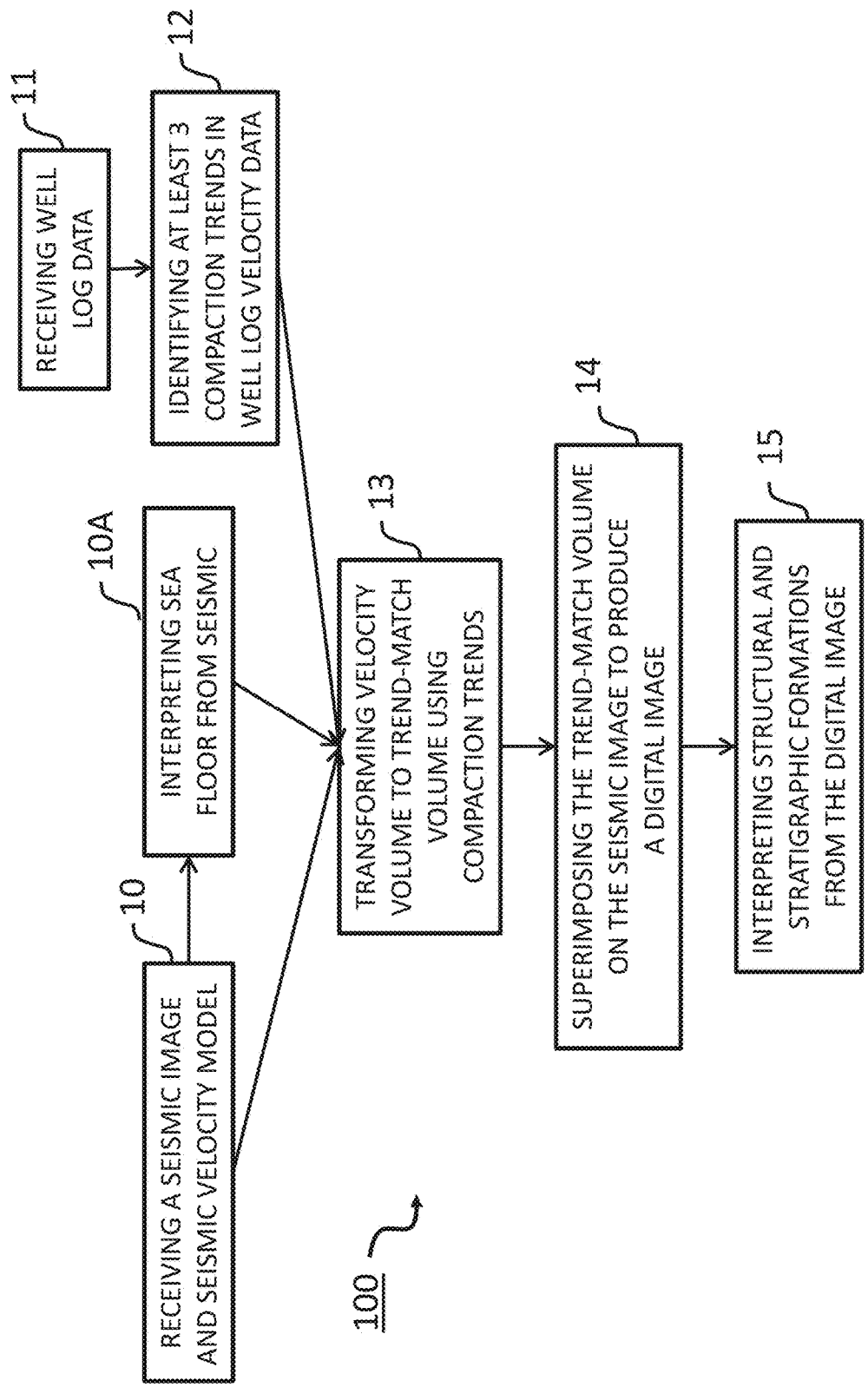
FIG. 1 illustrates a flowchart of a method of processing a velocity model to be combined with a seismic image in order to improve interpretation of hydrocarbon reservoirs, in accordance with some embodiments.

FIG. 1 illustrates a flowchart of a method 100 for interpretation of a subsurface region of interest. At operation 10, a seismic image and a related seismic velocity model is received. The seismic image may be a 2D seismic image or a 3D seismic image. The seismic image will have been generated using a seismic imaging method such as migration (e.g., Gaussian beam migration, reverse time migration) applied to a seismic dataset. The related seismic velocity model may have been determined from the seismic data using any velocity analysis method, such as semblance analysis, tomography, or full waveform inversion. In one embodiment, the seismic image may have been obtained by using the seismic velocity model as input to the seismic imaging method.

Seismic images of the subsurface may be useful to identify potential hydrocarbon reservoirs based on structural features of the subsurface. Seismic data is acquired at a surface (e.g. the earth's surface, ocean's surface, or at the ocean bottom) as seismic traces which collectively make up the seismic dataset. Processing seismic data and generating seismic images is a very complicated procedure. The dataset may have been subjected to a number of seismic processing steps, such as deghosting, multiple removal, spectral shaping, and the like. These examples are not meant to be limiting. Those of skill in the art will appreciate that there are a number of useful seismic processing steps that may be applied to seismic data before it is deemed ready for imaging.

At operation 11, well log data is received. Although there is no minimum number of wells needed, it is preferred to have regional wells that have penetrated the main rock facies so proper compaction trends can be derived. This well log data includes at least sonic well data indicative of $V_p$ (primary wave velocity). Detailed formation evaluation using as much well information as available can be done to properly evaluate rock facies within the wells. Wireline logs, mud logs, core analysis and so on are all possible inputs to the formation evaluation process. Different facies may also be determined directly from well results, e.g. source rock interval or reservoir intervals penetrated by well. These analyzed facies will then be used separately for developing different compaction trends. The well log data is obtained from wells drilled in regions believed to be analogous to the subsurface volume of interest. For example, the wells might be drilled in the same geologic basin as the subsurface volume of interest or might be drilled in a different geographical area in which at least a subsection of the well is believed to have a similar depositional history as the subsurface volume of interest.

Figure 2:
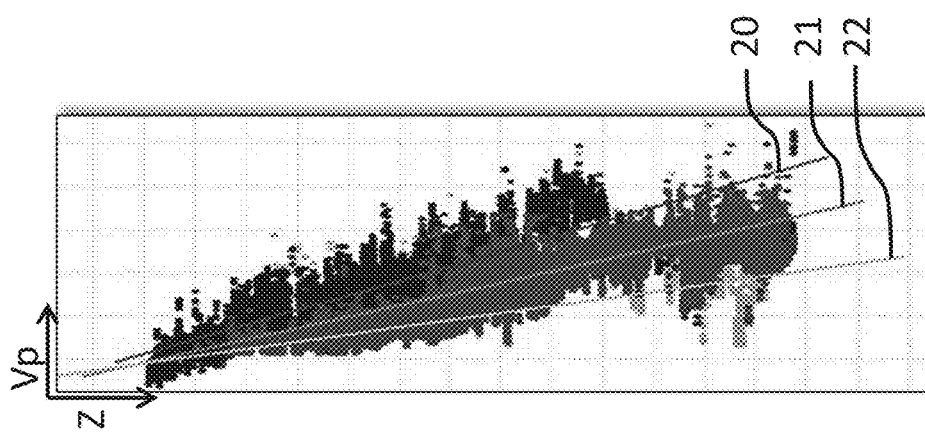
FIG. 2 illustrates a step of identifying three compaction trends in well log data.

The well log velocity data is used to identify at least three compaction trends (operation 12). Each of these trends is representative of a different depositional environment responsible for the creation of different shale facies. An example of this may be seen in FIG. 2. In FIG. 2, the vertical axis is depth below mudline and the horizontal axis is $V_p$. The data points are from well log data. This figure consists of a collection of sonic logs from mega-regional wells. The samples are colored by different facies which is based on facies analysis from formation evaluation as well as key zones identified by known reservoir and source rock penetrations. The facies analysis from formation evaluation is based on wireline logs and calibrated to other available information such as mud logs and core analysis. In this example, three types of shale facies are separated. The slower shale facies is linked to quiet deposition period with potential for source rock deposition. The medium shale facies is linked to normal clay dominated background shale trend. The faster shale facies is in general silty shale associated with higher volume of quartz deposition and deposited in higher energy depositional setting. Three compaction trends for $V_p$ are estimated based on these facies. The identified trends are indicated by lines 22 (slow trend), 21 (medium trend), and 20 (fast trend). Depending on the complexity of the subsurface, more trends may be identified. The trends are preferred to not cross each other within the depth of interest.

Referring again to FIG. 1, at operation 13 the at least three compaction trends are used to transform the seismic velocity model to produce a trend-match volume. This operation needs a sea floor horizon that is interpreted from the seismic image 10A or received along with the seismic image and velocity model. The first step of operation 13 is to generate three or more trend volumes based on the estimated trends. In each volume, the velocity trend is hung at the sea floor horizon in depth. The dimension of the volumes should match that of the seismic velocity volume. It can be a 3D volume or 2D volume depending on the input seismic velocity volume. The 3D volume can be from a 3D seismic survey, or can be an interpolated volume from one or more 2D seismic surveys. The second step is to compare the seismic velocity volume to the three or more trend volumes point-by-point and assign different values based on how it compares to the trend volumes. By way of example and not limitation, when the value of the seismic velocity volume at a specific point matches that of the slow trend volume at that point, the trend-match volume may be assigned a value of −100 at that point; if it matches the middle trend, the trend-match volume may be assigned a value of 0; if it matches the faster trend, the trend-match volume is assigned a value of 100. At points where the seismic velocity is between the trends, this operation may linearly interpolate between the values that are assigned for the trends. For seismic velocities slower than the slow trend or faster than the fast trend, the value is extrapolated. Using this method, a value can be calculated for every point of the trend-match volume wherever there is a seismic velocity value.

Figure 3:
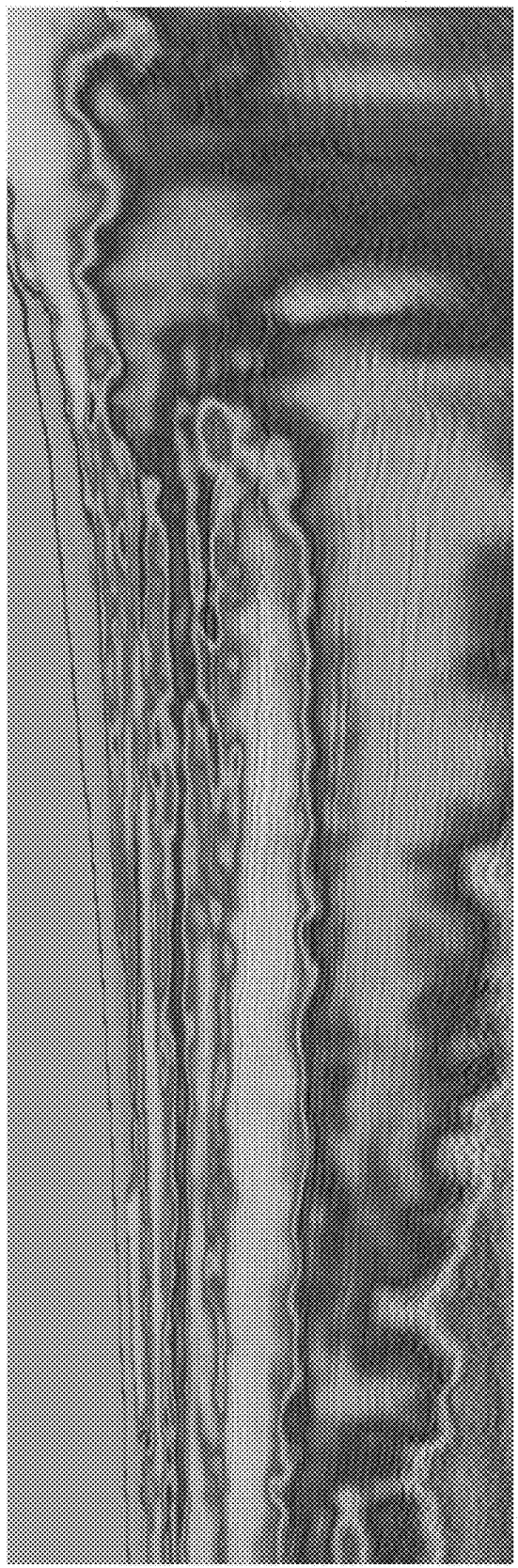
FIG. 3 is a digital image produced by an embodiment of the present invention.

The trend-match volume is superimposed on the seismic image at operation 14. This creates a digital image with the seismic events showing structural features of the subsurface and the trend-match volume representing the stratigraphic features of the subsurface. An example of this digital image is shown in FIG. 3. The combination of the structural features and stratigraphic features allows a greater understanding of the subsurface, including identification of source rock, migration paths, and potential hydrocarbon reservoirs. Such analysis is useful in both unconventional reservoirs, such as oil shale, and conventional reservoirs where the shale facies may act as a source rock or reservoir seal. Operation 15 of FIG. 1 interprets the superimposed digital image to determine structural and stratigraphic formations in the subsurface volume of interest. The seismic data will allow interpretation of structure and identification of main stratigraphic boundaries. The trend-match volume will allow identification of regional rock facies within the main stratigraphic boundaries and thus lead to interpretation of the stratigraphic framework. The superimposed image will allow the combination of two interpretations to be done simultaneously and consistently.

With the trend-match volume, each value is tied to specific rock facies which is linked to the interpretation of depositional settings. Therefore depositional settings can be interpreted from the colored display of the trend-match volume overlain on the seismic image. The interpretation of trend-match volume can also be integrated with the structural and stratigraphic interpretation of the seismic image to produce more accurate prediction of depositional settings. The results can be calibrated to wells if wells are available within the trend-match volume. The interpretation of depositional settings can then be used to assess the key risk elements such as reservoir deposition, source rock presence, and presence of sealing rock. A proper estimate of exploration risk can help with economic choices including facilitating the decision of drilling wells and optimization of drilling locations.

Figure 4:
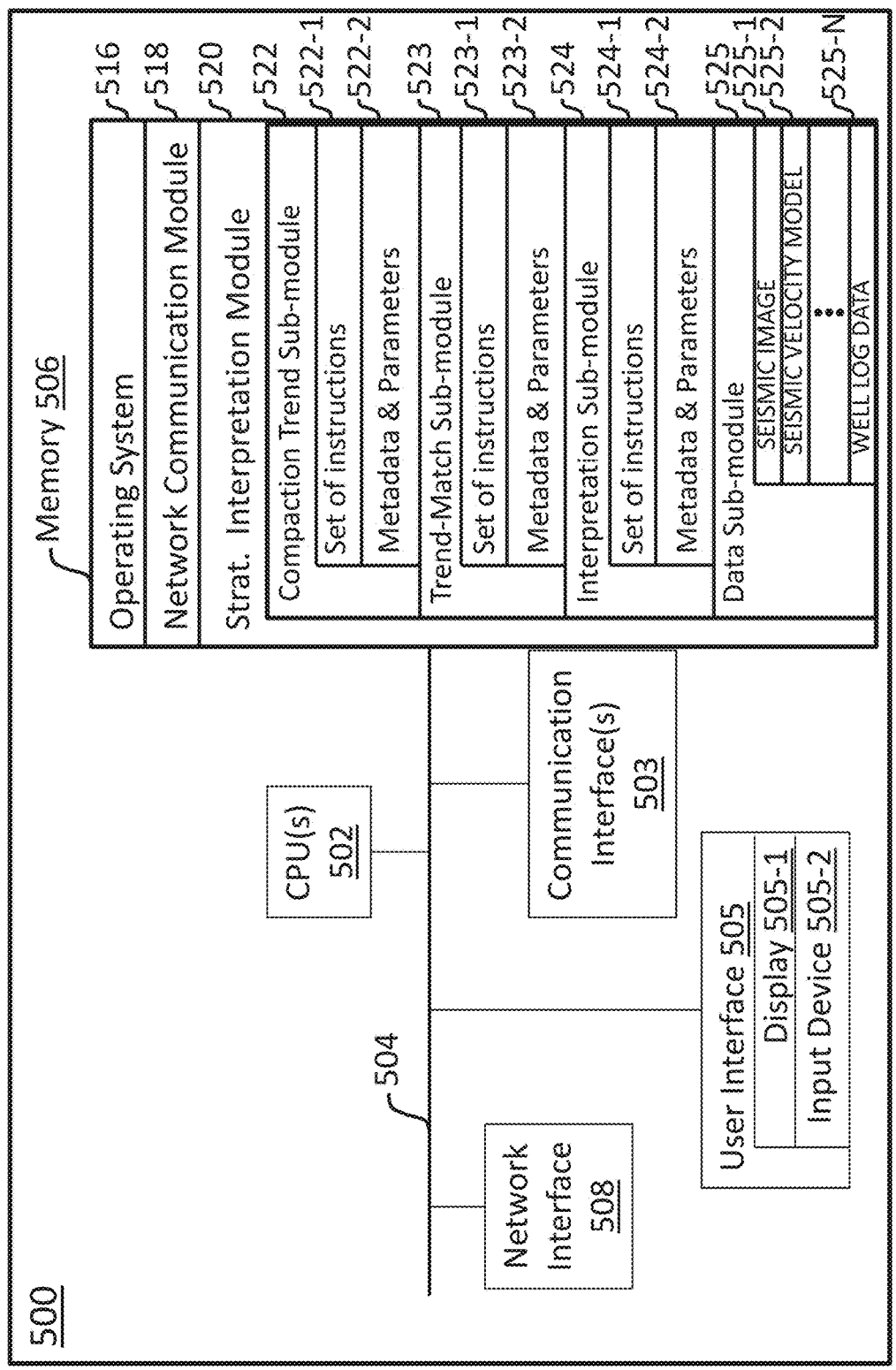
FIG. 4 is a block diagram illustrating a seismic interpretation system, in accordance with some embodiments.

FIG. 4 is a block diagram illustrating a seismic interpretation system 500, in accordance with some embodiments. While certain specific features are illustrated, those skilled in the art will appreciate from the present disclosure that various other features have not been illustrated for the sake of brevity and so as not to obscure more pertinent aspects of the embodiments disclosed herein.

To that end, the seismic interpretation system 500 includes one or more processing units (CPUs) 502, one or more network interfaces 508 and/or other communications interfaces 503, memory 506, and one or more communication buses 504 for interconnecting these and various other components. The seismic imaging system 500 also includes a user interface 505 (e.g., a display 505-1 and an input device 505-2). The communication buses 504 may include circuitry (sometimes called a chipset) that interconnects and controls communications between system components. Memory 506 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 506 may optionally include one or more storage devices remotely located from the CPUs 502. Memory 506, including the non-volatile and volatile memory devices within memory 506, comprises a non-transitory computer readable storage medium and may store seismic data, velocity models, seismic images, and/or geologic structure information.

In some embodiments, memory 506 or the non-transitory computer readable storage medium of memory 506 stores the following programs, modules and data structures, or a subset thereof including an operating system 516, a network communication module 518, and a seismic imaging module 520.

The operating system 516 includes procedures for handling various basic system services and for performing hardware dependent tasks.

The network communication module 518 facilitates communication with other devices via the communication network interfaces 508 (wired or wireless) and one or more communication networks, such as the Internet, other wide area networks, local area networks, metropolitan area networks, and so on.

In some embodiments, the stratigraphic interpretation module 520 executes the operations of method 100. Stratigraphic interpretation module 520 may include data sub-module 525, which handles the data including seismic image 525-1, seismic velocity model 525-2, and other data including well log data 525-N. This data is supplied by data sub-module 525 to other sub-modules.

Compaction trend sub-module 522 contains a set of instructions 522-1 and accepts metadata and parameters 522-2 that will enable it to execute operation 12 of method 100. The trend-match function sub-module 523 contains a set of instructions 523-1 and accepts metadata and parameters 532-2 that will enable it to contribute to operations 13 and 14 of method 100. The interpretation sub-module 524 contains a set of instructions 524-1 and accepts metadata and parameters 524-2 that will enable it to execute at least operation 15 of method 100. Although specific operations have been identified for the sub-modules discussed herein, this is not meant to be limiting. Each sub-module may be configured to execute operations identified as being a part of other sub-modules, and may contain other instructions, metadata, and parameters that allow it to execute other operations of use in processing seismic data and generate the seismic image. For example, any of the sub-modules may optionally be able to generate a display that would be sent to and shown on the user interface display 505-1. In addition, any of the seismic data or processed seismic data products may be transmitted via the communication interface(s) 503 or the network interface 508 and may be stored in memory 506.

Method 100 is, optionally, governed by instructions that are stored in computer memory or a non-transitory computer readable storage medium (e.g., memory 506 in FIG. 5) and are executed by one or more processors (e.g., processors 502) of one or more computer systems. The computer readable storage medium may include a magnetic or optical disk storage device, solid state storage devices such as flash memory, or other non-volatile memory device or devices. The computer readable instructions stored on the computer readable storage medium may include one or more of: source code, assembly language code, object code, or another instruction format that is interpreted by one or more processors. In various embodiments, some operations in each method may be combined and/or the order of some operations may be changed from the order shown in the figures. For ease of explanation, method 100 is described as being performed by a computer system, although in some embodiments, various operations of method 100 are distributed across separate computer systems.

While particular embodiments are described above, it will be understood it is not intended to limit the invention to these particular embodiments. On the contrary, the invention includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

The terminology used in the description of the invention herein is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A computer-implemented method of generating an improved digital image for a subsurface volume of interest, comprising:
   a. receiving, at a computer processor, a seismic image representative of the subsurface volume of interest and a velocity model;
   b. receiving, at the computer processor, well log data representative of wells drilled in an analogous region to that of the subsurface volume of interest;
   c. identifying, via the computer processor, at least three different rock facies in the well log data;
   d. estimating, via the computer processor, a compaction trend for each of the at least three rock facies to create at least three compaction trends;
   e. transforming, via the computer processor, the velocity model to produce a trend-match volume using the at least three compaction trends; and
   f. superimposing, via the computer processor, the trend-match volume and the seismic image to generate a digital image containing information regarding both structural features and stratigraphic features of the subsurface volume of interest.

2. The method of claim 1 further comprising interpreting geologic formations in the subsurface volume of interest based on the structural features and the stratigraphic features represented in the digital image.

3. The method of claim 2 further comprising using the geologic formations to explore for, develop, and produce from hydrocarbon reservoirs.

4. The method of claim 1 wherein the transforming the velocity model to produce a trend-match volume using the at least three compaction trends comprises:
   a. generating at least three trend volumes by hanging each of the at least three compaction trends at a water bottom in depth wherein each of the at least three trend volumes has a volume equal to the velocity model; and
   b. assigning values to each point in the trend-match volume based on comparing the velocity model point-by-point to each of the at least three trend volumes.

5. A computer system configured to generate an improved digital image for a subsurface volume of interest, comprising:
   one or more processors;
   memory; and
   one or more programs, wherein the one or more programs are stored in the memory and configured to be executed by the one or more processors, the one or more programs including instructions that when executed by the one or more processors cause the device to:
   a. receive a seismic image representative of the subsurface volume of interest and a velocity model;
   b. receive well log data representative of wells drilled in an analogous region to that of the subsurface volume of interest;

c. identify at least three different rock facies in the well log data;
d. estimate a compaction trend for each of the at least three rock facies identified in the well log data to create at least three compaction trends;
e. transform the velocity model to produce a trend-match volume using the at least three compaction trends; and
f. superimpose the trend-match volume and the seismic image to generate a digital image containing information regarding both structural features and stratigraphic features of the subsurface volume of interest.

6. A non-transitory computer readable storage medium storing one or more programs, the one or more programs comprising instructions for method of generating an improved digital image for a subsurface volume of interest, which when executed by an electronic device with one or more processors and memory, cause the device to a. receive a seismic image representative of the subsurface volume of interest and a velocity model;
b. receive well log data representative of wells drilled in an analogous region to that of the subsurface volume of interest;
c. identify at least three different rock facies in the well log data;
d. estimate a compaction trend for each of the at least three rock facies identified in the well log data to create at least three compaction trends;
e. transform the velocity model to produce a trend-match volume using the at least three compaction trends; and
f. superimpose the trend-match volume and the seismic image to generate a digital image containing information regarding both structural features and stratigraphic features of the subsurface volume of interest.

* * * * *